(12) United States Patent
Yoon et al.

(10) Patent No.: US 9,404,553 B2
(45) Date of Patent: Aug. 2, 2016

(54) SHOCK ABSORBER

(71) Applicant: MANDO CORPORATION, Pyeongtaek-si, Gyeonggi-do (KR)

(72) Inventors: Kyong Hag Yoon, Yongin-si (KR); Jin Kee Lee, Yongin-si (KR)

(73) Assignee: MANDO CORPORATION, Pyeongtaek-si (KR)

( * ) Notice: Subject to any disclaimer, the term of this patent is extended or adjusted under 35 U.S.C. 154(b) by 0 days.

(21) Appl. No.: 14/304,396

(22) Filed: Jun. 13, 2014

(65) Prior Publication Data
US 2015/0152937 A1 Jun. 4, 2015

(30) Foreign Application Priority Data

Dec. 3, 2013 (KR) ........................ 10-2013-0149351

(51) Int. Cl.
*F16F 9/512* (2006.01)
*F16F 9/58* (2006.01)
*F16F 9/516* (2006.01)

(52) U.S. Cl.
CPC ............... *F16F 9/5126* (2013.01); *F16F 9/516* (2013.01); *F16F 9/585* (2013.01); *F16F 2230/0041* (2013.01)

(58) Field of Classification Search
CPC ....... F16F 9/3214; F16F 9/504; F16F 9/5126; F16F 9/585; F16F 2230/0041
See application file for complete search history.

(56) References Cited

U.S. PATENT DOCUMENTS

| 3,251,278 | A * | 5/1966 | Royster .............................. 92/18 |
| 7,216,752 | B2 * | 5/2007 | Derra et al. ...................... 92/23 |
| 8,794,407 | B2 * | 8/2014 | Vanbrabant et al. ...... 188/322.15 |
| 9,003,953 | B2 * | 4/2015 | Brennan, III ..................... 92/27 |
| 2013/0333993 | A1 * | 12/2013 | Yu ............................ 188/322.22 |

FOREIGN PATENT DOCUMENTS

| BR | WO 2011130816 | A1 * | 10/2011 | ............. B60G 13/08 |
| DE | 2853914 | A1 * | 12/1978 | |
| DE | 102004005063 | A1 * | 9/2005 | |
| EP | 198180 | A2 * | 10/1986 | |
| FR | 2739667 | A1 * | 4/1997 | |
| KR | 1020110047974 | A | 5/2011 | |
| WO | WO 2007052581 | A1 * | 5/2007 | |
| WO | WO 2011111892 | A1 * | 9/2011 | |

* cited by examiner

*Primary Examiner* — Anna Momper
(74) *Attorney, Agent, or Firm* — Hauptman Ham, LLP

(57) ABSTRACT

Provided is a shock absorber, which has a cylinder filled with a fluid, a piston valve dividing the cylinder into a rebound chamber and a compression chamber, and a piston rod extending to the outside of the cylinder in a state of being connected to the piston valve. The shock absorber includes: a free piston which divides the compression chamber into an upper chamber and a lower chamber in such a state that the piston rod vertically passes through the free piston, and forms a vertical passage such that the upper chamber and the lower chamber are connected to each other; and a support which is connected to the piston rod, with a larger diameter, increases a pressure of the upper chamber by locally tightly contacting and ascending the free piston from below during a rebound stroke of the piston rod, and forms a horizontal passage connected to the vertical passage.

7 Claims, 4 Drawing Sheets

SHOCK ABSORBER

CROSS-REFERENCE(S) TO RELATED APPLICATION

This application claims the benefit of Korean Patent Application No. 10-2013-0149351, filed on Dec. 3, 2013, in the Korean Intellectual Property Office, the contents of which are incorporated herein by reference in its entirety.

BACKGROUND OF THE INVENTION

1. Field of the Invention

The present invention relates to a shock absorber, and more particularly, to a shock absorber which is capable of preventing mutual collision of internal parts by using a damping force through a movement of a fluid when excessive shock is transferred.

2. Description of the Related Art

Generally, a shock absorber is designed to suppress or reduce a vibration from a road surface. The shock absorber is mounted between a vehicle body or frame and a wheel, and absorbs vertical vibration energy of a vehicle body to thereby suppress a vibration and improve a ride comfort.

In addition, the shock absorber can increase a durability life by reducing dynamic stress of each part of a vehicle body, ensure a ground characteristic of a tire by suppressing a motion of unsprung mass, and improve motion performance of a vehicle by suppressing a posture change due to an inertial force.

The shock absorber includes a cylinder with an inner tube and an outer tube, a piston valve reciprocating within the inner tube, a piston rod having one end connected to the piston valve and the other end located outside the cylinder, and a body valve installed at an end of the cylinder to face the piston valve.

In addition, the shock absorber includes a stopper on an outer periphery of the piston rod so as to prevent collision between the piston valve and a rod guide due to a rebound of the piston rod when great shock is applied to the vehicle.

Examples of the conventional stopper include a rubber elastic body or a coil-type rebound spring, which is installed between the rod guide and the piston valve to apply an elastic compression force.

However, in the case where the coil-type spring is used as the stopper, the volume of the apparatus is increased and there is a difficulty in design due to the stroke of the stopper. When the total length is increased, the coil-type stopper inevitably generates noise due to the occurrence of buckling, and a separate guide needs to be applied for supporting both ends of the spring, which makes the configuration complicated.

In relation to the present invention, a damper is disclosed in Korean Patent Application Publication No. 10-2011-0047974 (published on May 9, 2011).

SUMMARY OF THE INVENTION

An aspect of the present invention is directed to provide a shock absorber, in which when excessive shock occurs in a region where road condition is poor, a free piston moves upward together at the same time as a rebound stroke of a piston rod and a pressure of an upper chamber is increased, thereby preventing collision of internal parts by using a damping force through a movement of a fluid.

Another aspect of the present invention is directed to provide a shock absorber, in which a reciprocating section of a free piston is not long and a configuration is simple, so that the degree of freedom of design can be improved and the production cost of equipment can be reduced.

According to the present invention, there is provided a shock absorber, which has a cylinder filled with a fluid, a piston valve dividing the cylinder into a rebound chamber and a compression chamber, and a piston rod extending to the outside of the cylinder in a state of being connected to the piston valve, the shock absorber including: a free piston which divides the compression chamber into an upper chamber and a lower chamber in such a state that the piston rod vertically passes through the free piston, and forms a vertical passage such that the upper chamber and the lower chamber are connected to each other; and a support which is connected to the piston rod, with a larger diameter, increases a pressure of the upper chamber by locally tightly contacting and ascending the free piston from below during a rebound stroke of the piston rod, and forms a horizontal passage connected to the vertical passage.

The piston rod may include a locking groove formed along a horizontal direction, and the free piston may include a locking portion moving downward together during only a compression stroke of the piston rod in a state of being locked and supported to the locking groove.

The free piston may further include: a hollow portion which vertically penetrates such that the piston rod is connected thereto; an installation groove which is formed inside the free piston such that the locking portion is positioned, and is opened in a direction of the hollow portion such that the installation groove is locked and supported to the locking groove; and an orifice groove which is concavely formed in a bottom surface of the free piston and forms the horizontal passage while locally tightly contacting the support.

The locking portion may include: a locking member which is installed inside the installation groove such that the blocking member is capable of protruding and being inserted in the direction of the hollow portion, and a protruding front end thereof is inserted into the corresponding locking groove; and an elastic member which applies an elastic compression force between the locking member and the installation groove.

The shock absorber may further include: a guide protrusion which is formed on an inner top surface of the installation groove and has a length in the direction of the hollow portion; and a guide groove which is formed in a top surface of the locking member such that the guide groove is paired with the guide protrusion and is guided in a protruding and inserting direction.

The locking groove and the front end of the locking member may have flat top surfaces, and bottom surfaces inclined in a mutually separating direction.

The free piston and the support may move upward in a state of being contacted with each other during the rebound stroke of the piston rod, and move downward in a state of being separated from each other during the compression stroke of the piston rod.

The shock absorber may further include a stopper which is installed at an upper end of the free piston and a lower end of the support so as to absorb shock at the time of collision.

DETAILED DESCRIPTION OF EXEMPLARY EMBODIMENTS

Hereinafter, preferred embodiments of the present invention will be described below in detail with reference to the accompanying drawings.

The above objects, features and advantages of the present invention will become more apparent from the following description taken in conjunction with the accompanying drawings.

However, it should be understood that the present invention is not limited to the following embodiments, and various modifications can be made without departing from the scope of the present invention. The embodiments set forth herein are provided so that this disclosure will be thorough and complete, and will fully convey the concept of the invention to those skilled in the art. The present invention should be defined by the appended claims.

Therefore, in some embodiments, well-known elements, well-known operations, and well-known technologies are not specifically described so as to avoid ambiguous interpretation.

Figure 1:
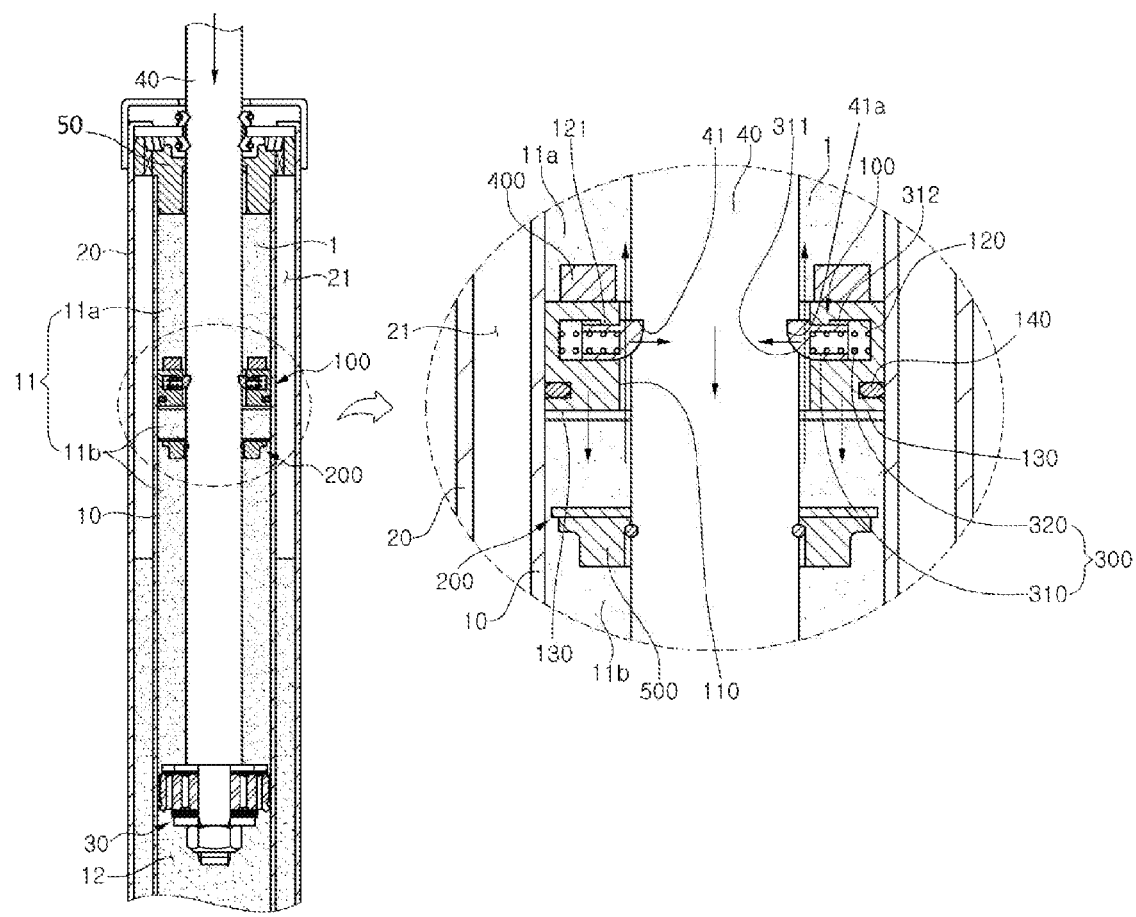
FIG. 1 is a front cross-sectional view illustrating a compression stroke of a shock absorber according to the present invention.
Figure 2:
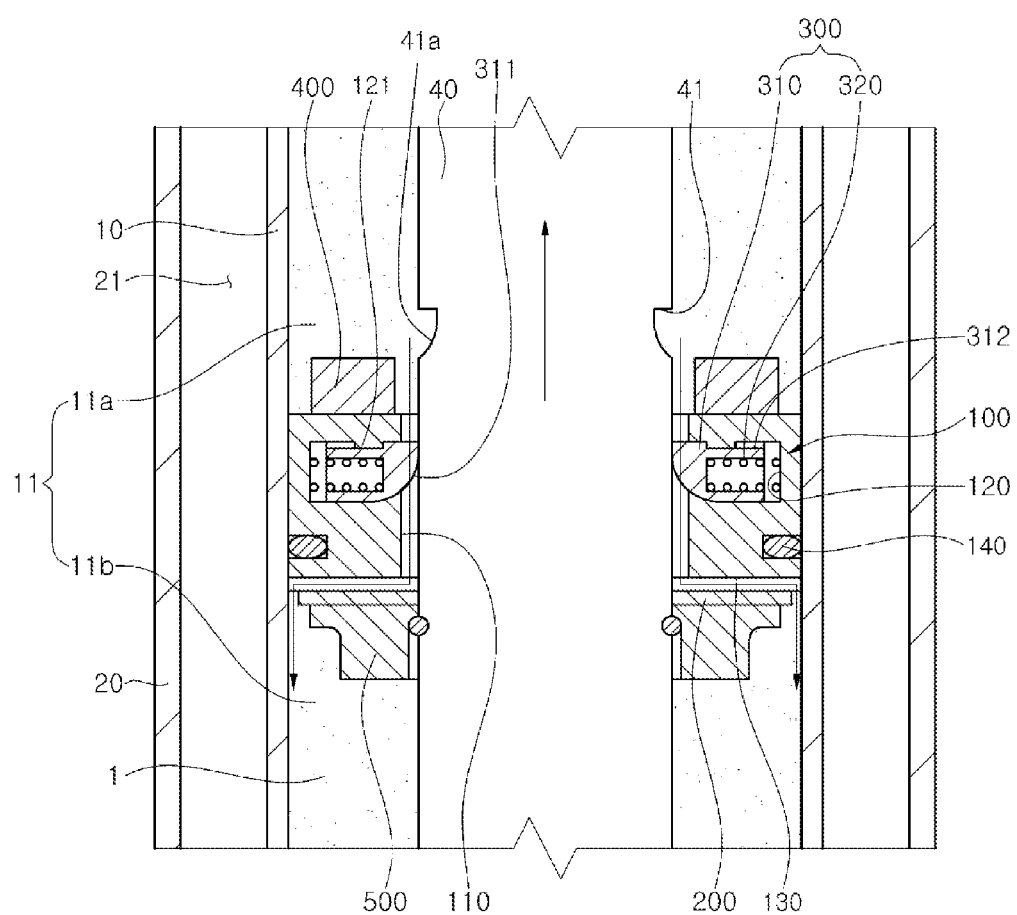
FIG. 2 is a front cross-sectional view illustrating a rebound stroke of the shock absorber according to the present invention.
Figure 3:
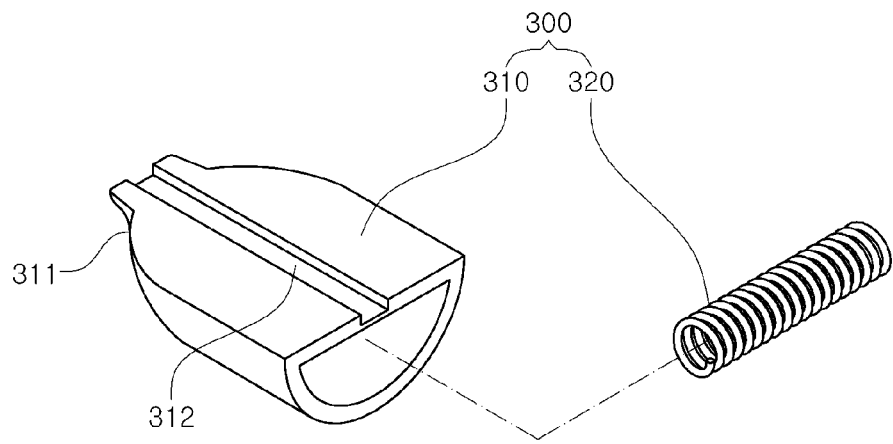
FIG. 3 is a perspective view illustrating a locking portion of the shock absorber according to the present invention.
Figure 4:
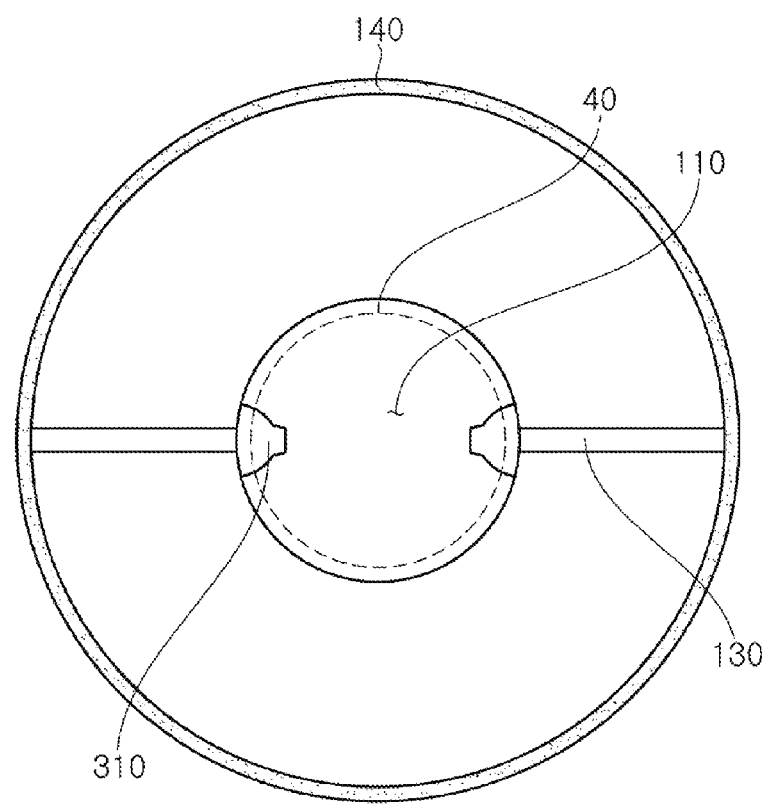
FIG. 4 is a plan view illustrating a free piston of the shock absorber according to the present invention.

FIG. 1 is a front cross-sectional view illustrating a compression stroke of a shock absorber according to the present invention, and FIG. 2 is a front cross-sectional view illustrating a rebound stroke of the shock absorber according to the present invention.

Referring to FIGS. 1 and 2, the shock absorber according to the present invention includes cylinders 10 and 20, a piston valve 30, a piston rod 40, a body valve (not illustrated), a free piston 100, a support 200, and a locking portion 300.

In addition, the cylinder may have a dual cylinder structure in which the cylinder is divided into an inner tube 10 and an outer tube 20, and a rod guide 50 may be further installed at an upper end of the cylinder so as to guide the piston rod 40.

Although it is preferable that the shock absorber according to the present invention is applied to the dual cylinder structure, the present invention can also be applied to a single cylinder type shock absorber having a single cylinder.

Of the above-described components, the inner tube 10 of the cylinder has a cylindrical shape which forms an internal space, and the inner tube 10 is filled with a fluid (oil) 1.

The inside of the inner tube 10 may be divided into an upper rebound chamber 11 and a lower compression chamber 12 by a piston valve 30, which is to be described below, with reference to a direction of illustration.

The fluid 1 can selectively move between the rebound chamber 11 and the compression chamber 12 through a passage formed in the piston valve 30.

The outer tube 20 has a diameter larger than an outer diameter of the above-described inner tube 10, and may have a shape corresponding to the outer diameter of the inner tube 10.

A reservoir 21 having a predetermined interval is formed between the outer tube 20 and the inner tube 10 so as to allow the fluid 1 to move.

That is, the fluid 1 received in the compression chamber 12 of the inner tube 10 may move to the reservoir 21 through a passage of the body valve, which is to be described below.

In addition, one end of the outer tube 20 and one end of the piston rod 40, which is to be described below, are connected to a vehicle body side or a wheel side of the vehicle. In this state, the shock absorber may perform a compression stroke and a rebound stroke.

Furthermore, a separate connecting portion for connection with the vehicle body side or the wheel side may be installed at a lower end of the outer tube 20.

The piston valve 30 vertically divides the inside of the inner tube 10, and the piston valve 30 generates a damping force by the resistance of the fluid 1 while reciprocating within the inner tube 10.

The side of the piston valve 30 is moved in a direction of the compression or rebound stroke in a state of being tightly contacted with the inner periphery of the inner tube 10.

The fluid 1 vertically moves through the passage of the piston valve 30, and a damping force is generated by the resistance while the fluid 1 is moving in the direction of the rebound and compression strokes.

A valve unit (not illustrated) is selectively provided in an upper portion and a lower portion of the piston valve 30 so as to open or close the passage in a selected direction.

For example, during the compression stroke of the piston valve 30 (downward movement the direction of illustration), the pressure of the lower compression chamber 12 is increased as compared with the upper rebound chamber 11.

At this time, due to the increase in the pressure of the compression chamber 12, the fluid 1 filled in the compression chamber 12 pushes and opens the valve unit through the passage and moves to the rebound chamber 11.

On the contrary, during the rebound stroke of the piston valve 30 (upward movement in the direction of illustration), the operation reverse to the above-described operation is performed.

The piston rod 40 has one end connected to the piston valve 30, and the other end extending to the outside of the outer tube 20 and connected to the vehicle body side or the wheel side of the vehicle.

That is, the piston rod 40 is connected to the vehicle body side or the wheel side of the vehicle and performs the compression or rebound operation together with the above-described outer tube 20.

In particular, one or a plurality of locking grooves 41 are concavely formed in the piston rod 40 along a horizontal direction.

The locking grooves 41 refer to grooves which a protruding front end of a locking member 310 to be described below can be inserted into or removed from.

The top surface of the locking groove 41 may be flat, and a first inclination surface 41a inclined in a direction of separating from the locking member 310 may be formed in the bottom surface of the locking groove 41.

The first inclination surface 41a may be formed to have a straight-line shape or a downwardly concave curved surface, and the top surface and the bottom surface of the locking member 310 may also have a corresponding shape.

The body valve (not illustrated) is fixedly installed in the bottom ends of the inner tube 10 and the outer tube 20 and separates the compression chamber 12 and the reservoir 21.

At this time, the fluid 1 moves upward or downward through the passage of the body valve, and a damping force is generated by the resistance while the fluid 1 is moving in the direction of the rebound and compression strokes.

A valve unit (not illustrated) is provided in both or either of an upper portion and a lower portion of the body valve so as to open or close the passage in a selected direction.

For example, during the compression stroke of the piston valve 30 (downward movement in the direction of illustration), the fluid 1 moves to the reservoir 21 through the passage of the body valve.

On the contrary, during the rebound stroke of the piston valve 30 (upward movement in the direction of illustration), the operation reverse to the above-described operation is performed.

The free piston 100 is installed to be elevatable within the inner tube 10 as illustrated in FIGS. 1 and 2.

The free piston 100 divides the rebound chamber 11 into an upper chamber 11a and a lower chamber 11b in such astute that the piston rod 40 vertically passes through the free piston 100.

The free piston 100 forms a vertical passage no as to connect the upper chamber 11a and the lower chamber 11b. The vertical passage refers to an interval between a hollow portion 110 to be described below and the piston rod 40.

For this purpose, the hollow portion 110, an installation groove 120, and an orifice groove 130 may be formed in the free piston 100.

It is preferable that the hollow portion 110 has a shape corresponding to the piston rod 40, but, if necessary, the shape may be variously applied.

The hollow portion 110 is spaced apart with a diameter larger than the outer periphery of the piston rod 40 such that the fluid 1 received in the upper chamber 11a can flow into the lower chamber 11b.

That is, the hollow portion 110 vertically penetrates such that the piston rod 40 vertically passes therethrough, and forms a vertical passage in a state of being separated from the outer periphery of the piston rod 40.

The installation groove 120 is formed inside the free piston 100 such that the locking member 310 of the locking portion 300 and an elastic member 320 are positioned therein.

The installation groove 120 is opened in the direction of the hollow portion 110 such that the locking portion 300 is locked and supported to the locking groove 41.

As such, the shape and thickness of the installation groove 120 may be variously applied according to the shape and thickness of the locking member 310 and the elastic member 320.

The orifice groove 130 is concavely formed in the bottom surface of the free piston 100, and forms a horizontal passage while locally tightly contacting the support 200, which is to be described below.

Since the orifice groove 130 is in a downwardly opened state, the orifice groove 130 serves as the horizontal passage only when the orifice groove 130 locally tightly contacts the support 200.

That is, the lower end of the vertical passage formed by the hollow portion 110 is connected to one end of the horizontal passage formed by the orifice groove 130 and the top surface of the support 200.

The fluid 1 moving along the horizontal passage formed by the orifice groove 130 and the support 200 can move to the lower chamber 11b through the side of the support 200.

In addition, an O-ring 140 may be further connected to the outer periphery of the free piston 100 so as to provide tight contact with the inner periphery of the inner tube 10.

For this purpose, an insertion groove may be concavely formed in the outer periphery of the free piston 100, such that the O-ring 140 can be inserted thereinto correspondingly.

Furthermore, an upper stopper 400 may be further provided at the upper end of the free piston 100 so as to absorb shock at the time of collision between the piston valve 30 and the rod guide 50.

The upper stopper 400 may be made of a synthetic resin or a rubber having a predetermined shock-absorbing force.

The support 200 is connected to a predetermined position of the piston rod 40, with a larger diameter, as illustrated in FIGS. 1 and 2.

The side of the support 200 is spaced apart from the inner periphery of the inner tube 10 by a predetermined interval, such that the fluid 1 can move vertically.

At this time, the support 200 locally tightly contacts and ascends the free piston 100 from below during the rebound stroke of the piston rod 40, thereby increasing the pressure of the upper chamber 11a.

At the same time, the support 200 forms the horizontal passage by blocking the lower end of the orifice groove 130 so as to connect to the vertical passage formed by the hollow portion 110.

That is, during the rebound stroke of the piston rod 40, the fluid 1 of the upper chamber 11a, of which the pressure is increased, is moved to the lower chamber 11b through the side of the support 200 along the vertical passage and the horizontal passage.

As such, the support 200 and the free piston 100 move upward in a contacted state during the rebound stroke of the piston rod 40 as illustrated in FIG. 1.

On the contrary, the support 200 and the free piston 100 move downward in a separated state during the compression stroke of the piston rod 40 as illustrated in FIG. 2.

In addition, a lower stopper 500 may be further provided at the upper end of the support 200 so as to absorb shock at the time of collision between the support 200 and the piston valve 30.

The lower stopper 500 may be made of a synthetic resin or a rubber having a predetermined shock-absorbing force.

The locking portion 300 moves downward in a state in which the upper end the of is locked to the locking groove 41 during only the compression stroke of the piston rod 40.

At this time, since the locking portion 300 is in a state of being locked and supported to the locking groove 41, the piston rod 40 and the free piston 100 move downward together.

For this purpose, the locking portion 300 may include the locking member 310 and the elastic member 320.

The locking member 310 is installed inside the installation groove 120 such that it can protrude and be inserted in the direction of the hollow portion 110, and the protruding front end of the locking member 310 is inserted into the corresponding locking groove 41.

At this time, the front end of the locking member 310 has a shape corresponding to the locking groove 41 such that it is locked only when the piston rod 40 moves downward.

For this purpose, the top surface of the front end of the locking member 310 is flat, and a second inclination surface 311 inclined in a direction of separating from the locking groove 41 is formed in the bottom surface of the locking member 310.

That is, during the compression stroke (downward movement) of the piston rod 40, the front end of the locking member 310 is inserted into the locking groove 41. At this time, the top surface of the locking groove 41 moves the piston rod 40 downward while supporting the top surface of the locking member 310.

On the contrary, during the rebound stroke (upward movement) of the piston rod 40, the second inclination surface 311 of the locking member 310 is released to the outside while being slid from the first inclination surface 41a of the locking groove 41.

At this time, the locking member 310 is inserted into the installation groove 120 while compressing the elastic member 320.

Then, in a state in which the piston rod 40 and the free piston 100 are disconnected, the support 200 pushes up the free piston 100 from below.

Meanwhile, a guide protrusion 122 having a length in the direction of the hollow portion 110 may protrude downward from the inner top surface of the installation groove 120.

A guide groove 312 may be formed in the top surface of the locking member 310 such that it is paired with the guide protrusion 122 and is guided in the protruding and inserting direction.

That is, since the guide protrusion 122 guides the guide groove 312 in the protruding and inserting direction, the locking member 310 can protrude and be inserted into the accurate position, without shaking.

The elastic member 320 is installed between the outer periphery of the locking member 310 and the inner periphery of the installation groove 120 and applies an elastic compression force to the locking member 310.

For this purpose, it is preferable that the elastic member 320 uses a coil spring, but a bent leaf spring may also be used.

Hereinafter, the operation of the shock absorber according to the present invention will be described with reference to FIGS. 1 and 2.

As illustrated in FIG. 1, when the piston rod 40 performs the compression stroke, the front end of the locking member 310 is inserted into the corresponding locking groove 41 while the piston rod 40 is moving downward.

The locking groove 41 moves downward while pushing down the front end of the locking member 310, and the pressure of the lower chamber 11b located in the compression chamber 12 is increased by the downward movement of the free piston 100.

At this time, the fluid 1 of the lower chamber 11b, of which the pressure is increased, moves to the upper chamber 11a, of which the pressure is relatively low, through the vertical passage.

Herein, as illustrated in FIG. 2, the support 200 moving downward together with the piston rod 40 moves downward while maintaining a predetermined interval from the free piston 100.

As illustrated in FIG. 2, when the piston rod 40 performs the rebound stroke, the locking groove 41 and the front end of the locking member 310 are separated while the piston rod 40 is moving upward.

While the piston rod 40 is moving upward, the support 200 applies a force in a state of being tightly contacted with the lower portion of the free piston 100.

At this time, the pressure of the upper chamber 11a is increased while the free piston 100 is moving upward, and the fluid 1 of the upper chamber ha moves to the lower chamber 11b along the vertical passage and the horizontal passage.

In this process, the free piston 100 moves upward by a rebound stroke distance of the piston rod 40, and the pressure of the upper chamber 11a is increased by the upward movement of the free piston 100, thereby performing a stopping operation for preventing collision between the piston valve 30 and the rod guide 50.

As such, the damping force is generated by the resistance while the fluid 1 of the upper chamber 11a moves to the lower chamber 11b through the hollow portion 110 and orifice.

Consequently, when excessive shock occurs in a region where road condition is poor, the free piston 100 moves upward together at the same time as the rebound stroke of the piston rod 40 and the pressure of the upper chamber 11a is increased, thereby preventing collision of internal parts by using the damping force through the movement of the fluid 1.

Since the reciprocating section of the free piston 100 is not long and the configuration is simple, the degree of freedom of design can be improved and the production cost of equipment can be reduced.

While the embodiments of the present invention have been described with reference to the specific embodiments, it will be apparent to those skilled in the art that various changes and modifications may be made without departing from the spirit and scope of the invention as defined in the following claims.

The scope of the present invention should not be limited to the above-described embodiments and should be defined by the appended claims and the equivalents thereof.

The foregoing embodiments are exemplary in all aspects and should be construed as not limiting the present invention. Not only the following claims but any equivalent or equivalent change thereof fall within the scope of the present invention.

| DESCRIPTION OF REFERENCE NUMERALS | |
| --- | --- |
| 1: fluid | 10: inner tube |
| 11: rebound chamber | 11a: upper chamber |
| 11b: lower chamber | 12: compression chamber |
| 20: outer tube | 21: reservoir |
| 30: piston valve | 40: piston rod |
| 41: locking groove | 41a: first inclination surface |
| 50: rod guide | 100: free piston |
| 110: hollow portion | 120: installation groove |
| 121: guide protrusion | 130: orifice groove |
| 140: O-ring | 200: support |
| 300: locking portion | 310: locking member |
| 311: second inclination surface | 312: guide groove |
| 220: elastic member | |

What is claimed is:

1. A shock absorber, comprising:
a cylinder filled with a fluid;
a piston valve dividing the cylinder into a rebound chamber and a compression chamber;
a piston rod extending to the outside of the cylinder, and connected to the piston valve;
a free piston which
divides the rebound chamber into an upper chamber and a lower chamber, wherein the piston rod is configured to vertically pass through the free piston, and
forms a vertical passage, wherein the upper chamber and the lower chamber are connected to each other through the vertical passage; and
a support which
is disposed below the free piston,
is connected to the piston rod,
has a larger diameter than the piston rod,
is configured to increase a pressure of the upper chamber by approaching to the free piston from below during a rebound stroke of the piston rod, and
forms a horizontal passage connected to the vertical passage,
wherein the piston rod includes a locking groove disposed along a horizontal direction of the piston rod,
wherein the free piston includes a locking portion configured to move downward together with the locking groove during only compression stroke of the piston rod, and
wherein, when the locking portion moves downward, the locking portion is locked to and supported by the locking groove.

2. The shock absorber according to claim 1, wherein the free piston further includes:
- a hollow portion which vertically penetrates the free piston, wherein the hollow portion is connected to the piston rod;
- an installation groove which is disposed inside the free piston, wherein the locking portion is positioned in the installation groove, wherein the installation groove is opened toward the hollow portion, and wherein the installation groove is locked to and supported by the locking groove; and
- an orifice groove which has a concave shape, is disposed in a bottom surface of the free piston, and forms the horizontal passage while locally tightly contacting the support.

3. The shock absorber according to claim 2, wherein the locking portion includes:
- a locking member which is installed inside the installation groove, the locking member protruding toward the hollow portion, and having a protruding front end configured to be inserted into the locking groove; and
- an elastic member configured to apply an elastic compression force between the locking member and the installation groove.

4. The shock absorber according to claim 3, further comprising:
- a guide protrusion which is disposed on an inner top surface of the installation groove, wherein the guide protrusion protrudes toward the hollow portion; and
- a guide groove which is disposed in a top surface of the locking member, wherein the guide groove is paired with the guide protrusion for guiding the guide protrusion in a protruding and inserting direction.

5. The shock absorber according to claim 3, wherein the locking groove and the front end of the locking member have flat top surfaces, and bottom surfaces inclined in opposite directions.

6. The shock absorber according to claim 1,
- wherein the free piston and the support are configured to move upward, when the free piston and the support are contacted with each other during the rebound stroke of the piston rod, and
- wherein the free piston and the support are configured to move downward, when the free piston and the support are separated from each other during a compression stroke of the piston rod.

7. The shock absorber according to claim 1, further comprising:
- a first stopper which is disposed at an upper end of the free piston, and
- a second stopper which is disposed at a lower end of the support,
- wherein the stoppers are configured to absorb shock at the time of collision.

* * * * *